(12) United States Patent
Liu et al.

(10) Patent No.: US 7,376,634 B2
(45) Date of Patent: May 20, 2008

(54) METHOD AND APPARATUS FOR IMPLEMENTING Q&A FUNCTION AND COMPUTER-AIDED AUTHORING

(75) Inventors: Shi Xia Liu, Beijing (CN); Li Ping Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 10/952,258

(22) Filed: Sep. 28, 2004

(65) Prior Publication Data
US 2005/0137723 A1      Jun. 23, 2005

(30) Foreign Application Priority Data
Dec. 17, 2003   (CN) .................. 2003 1 0121286

(51) Int. Cl.
    *G06F 15/18* (2006.01)
(52) U.S. Cl. .................. 706/61; 706/59; 707/3; 707/6
(58) Field of Classification Search ............. 706/61, 706/59; 707/3, 6
    See application file for complete search history.

(56) References Cited

U.S. PATENT DOCUMENTS

| | | | | |
|---|---|---|---|---|
| 5,873,107 A | * | 2/1999 | Borovoy et al. ......... 715/501.1 |
| 6,028,601 A | * | 2/2000 | Machiraju et al. .......... 715/705 |
| 6,064,952 A | * | 5/2000 | Imanaka et al. ................ 704/9 |
| 6,076,051 A | * | 6/2000 | Messerly et al. .............. 704/9 |
| 6,243,090 B1 | * | 6/2001 | Machiraju et al. .......... 715/709 |
| 6,993,517 B2 | * | 1/2006 | Naito et al. ..................... 707/3 |
| 2002/0042041 A1 | * | 4/2002 | Owens et al. ................ 434/322 |

OTHER PUBLICATIONS

"A Rule-based Question Answering System for Reading Comprehension Tests", Riloff, E. and Thelen, M., (2000), ANLP/NAACL-2000 Workshop on Reading Comprehension Test as Evaluation for Computer-Based Language Understanding Systems.*

* cited by examiner

*Primary Examiner*—David Vincent
*Assistant Examiner*—Mai T Tran
(74) *Attorney, Agent, or Firm*—Gibb & Rahman, LLC

(57) ABSTRACT

The present invention provides a method for implementing Q&A function for an electronic document, a method for computer-aided authoring, a method for browsing an electronic document, a computer-aided authoring apparatus, a browser capable of providing Q&A function, a method for providing Q&A service utilizing computers and a system for providing Q&A service. Said method for implementing Q&A function for an electronic document includes: when the writer is writing an electronic document, generating Q&A information used for Q&A function so that the reliability of the generated Q&A information is ensured by the writer; saving said Q&A information in correspondence with said electronic document; and using said Q&A information for providing Q&A function.

28 Claims, 9 Drawing Sheets

METHOD AND APPARATUS FOR IMPLEMENTING Q&A FUNCTION AND COMPUTER-AIDED AUTHORING

TECHNICAL FIELD

The present invention relates to data processing techniques, in particular, to the techniques for implementing function of question and answer (Q&A) and computer-aided authoring.

TECHNICAL BACKGROUND

In the past, there are techniques for providing function of question and answer (Q&A) for electronic document. For instance, Web site www.ask.com provided by Ask Jeeves® Company is a typical example. They compose questions and extract answers for existing electronic documents and provide Q&A service to users.

However, during implementing the traditional Q&A function, document writing tools are independent of Q&A service providing tools. When a writer is writing a document, he/she does not care how readers will leverage the content written by him/her; on the other hand, readers find it quite challenging to get the information he wants. Currently computer's capability of natural language understanding is still at word level understanding, while for the Q&A applications, there is a need of sentence and document level understanding together with semantic capabilities. Therefore, with the present speed in technology development, it is believed that in a near future it is impossible to meet the user requirements on Q&A function.

SUMMARY OF THE INVENTION

In order to solve the above mentioned problems of prior art, the present invention proposes that the writer is enabled to prepare related information for subsequent implementation of Q&A function when he is writing a document; that is, a set of tools is provided to the writer to conveniently contribute to subsequent user's Q&A function. Furthermore, a system providing Q&A service may use the Q&A information prepared (or verified) by the writer to provide more accurate and more comprehensive answers to users.

According to one aspect of the present invention, there is provided a method for implementing Q&A function for an electronic document, including: when the writer is writing an electronic document, generating Q&A information used for Q&A function; saving said Q&A information in correspondence with said electronic document; and using said Q&A information to provide Q&A function.

According to another aspect of the present invention, there is provided a method for computer-aided authoring, including: when the writer is writing a document, generating Q&A information corresponding to said electronic document; and saving said Q&A information in correspondence with said electronic document.

According to still another aspect of the present invention, there is provided a method for browsing electronic documents, wherein Q&A information used for Q&A function is saved in correspondence with said electronic document, said method includes: reading the content of said electronic document and its corresponding Q&A information; presenting the content of said electronic document to the user; in response to the user's operation, providing Q&A function by using said Q&A information.

According to still another aspect of the present invention, there is provided a computer-aided authoring apparatus, including: an electronic document editing unit for editing an electronic document; question generation unit for generating one or more questions based on the entered text in said electronic document editing unit; an answer generation unit for generating answers for the questions generated by said question generation unit based on the text in said electronic document editing unit; and a Q&A information storage unit for storing said generated questions and corresponding answers as Q&A information in correspondence with said edited electronic document.

According to still another aspect of the present invention, there is provided a browser capable of providing Q&A function, including: an electronic document browsing unit for browsing an electronic document; a Q&A information extraction unit for extracting Q&A information saved in correspondence with said browsed electronic document, wherein said Q&A information contains questions and corresponding answers related to the electronic document; a Q&A presentation unit for presenting the questions and answers contained in said Q&A information to the user.

According to still another aspect of the present invention, there is provided a method for providing Q&A service by utilizing computers, including: extracting Q&A information corresponding to a plurality of electronic documents, respectively, wherein said Q&A information contains questions and corresponding answers related to said electronic documents; indexing extracted Q&A information; based on the question entered by the user, finding one or more the most similar questions from said Q&A information; and presenting said questions and corresponding answers to said user.

According to still another aspect of the present invention, there is provided a system for providing Q&A service, including: Q&A information extraction means for extracting Q&A information corresponding to a plurality of electronic documents, respectively, wherein said Q&A information contains questions and corresponding answers related to said electronic documents; Q&A indexing means for indexing extracted Q&A information; a Q&A index library for storing Q&A information index prepared by said Q&A indexing means; Q&A searching means for finding one or more the most similar questions from said Q&A index library based on the question entered by the user; and Q&A presentation means for presenting said found questions and corresponding answers to said user.

BRIEF DESCRIPTION OF THE DRAWINGS

It is believed that the above mentioned features, advantages and objectives will be better understood through the following description of the preferred embodiments of the present invention with reference to the drawings, in which.

DETAILED DESCRIPTION OF THE INVENTION

Next, detailed description will be given to the preferred embodiments of the present invention with reference to the drawings.

Method for Implementing Q&A Function for an Electronic Document

Figure 1:
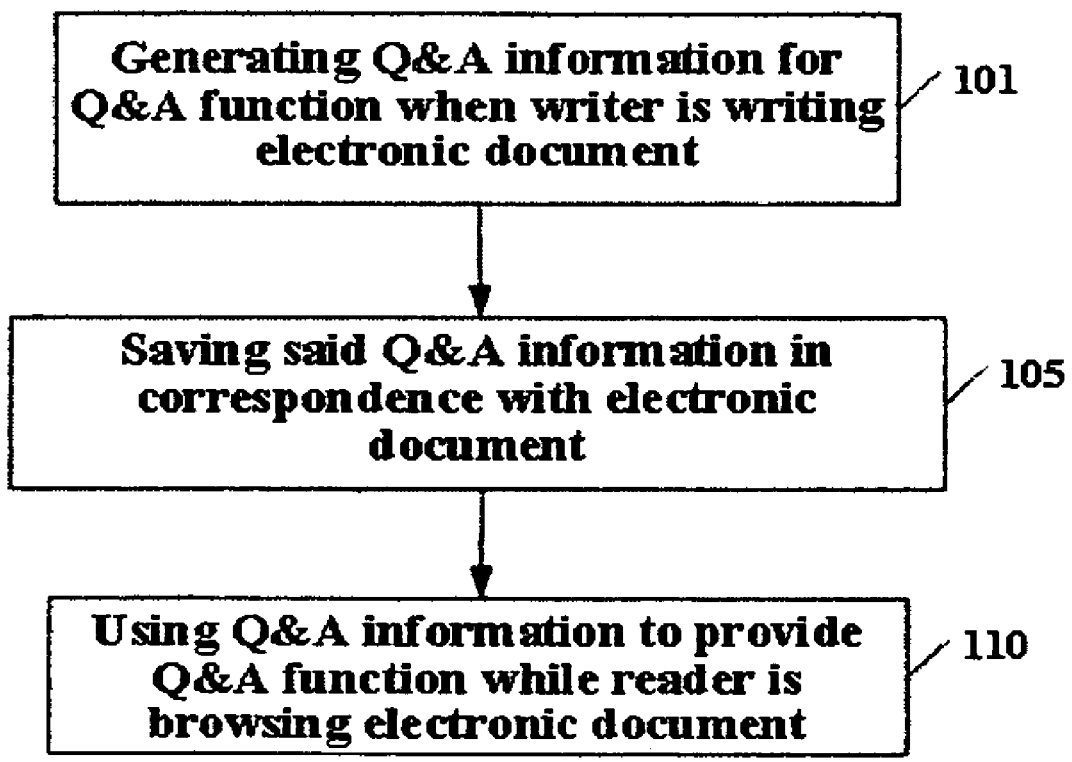
FIG. 1 is a flowchart showing a method for implementing Q&A function for an electronic document according to an embodiment of the present invention.

According to one aspect of the present invention, there is provided a method for implementing Q&A function for an electronic document. FIG. 1 is a flowchart showing the method for implementing Q&A function for an electronic document according to an embodiment of the present invention.

As shown in FIG. 1, first at step 101, Q&A information used for Q&A function is generated when a writer is writing an electronic document. Here, the information used for Q&A function includes information indicating the contents of questions and answers, respectively. When a writer is writing a document, he is preparing Q&A information as well, thereby the Q&A information may be used to provide Q&A function when the electronic document is browsed subsequently.

Next, at step 105, said Q&A information is saved in correspondence with said electronic document. In the present invention, there is no limit to the specific way in which the Q&A information is saved. For instance, it may be saved together with the electronic document, that is, as a part of the electronic document, or may be saved separately, as long as it is saved in correspondence with the electronic document. Next, at step 110, when a reader is browsing said electronic document, said Q&A information is used for providing Q&A function. That is, a Q&A function is provided to the user according to the questions and answers contained in the Q&A information.

Figure 2:
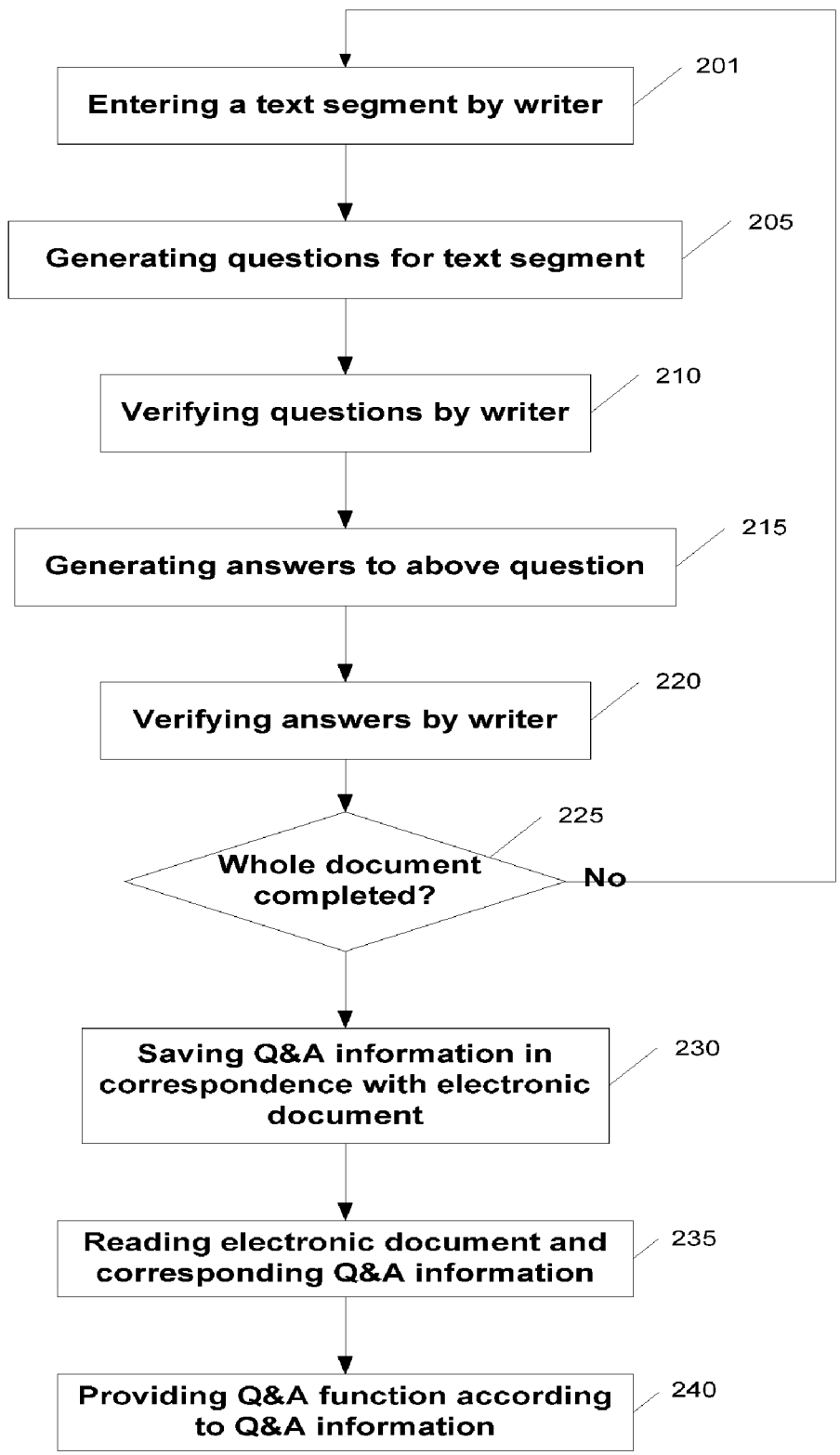
FIG. 2 is a flowchart showing a method for implementing Q&A function for an electronic document according to an embodiment of the present invention in more details.

Thus, according to the present embodiment, when a writer is writing a document, he may participate in preparing Q&A information, so that the writer's understanding to the document (it is definitely the most accurate understanding) may be used to ensure the accuracy of the generated questions and answers, whereby the accuracy and usability of the Q&A function may be greatly improved. Next, in conjunction with FIGS. 2-5, a description will be given to the method of the present embodiment in more details. FIG. 2 is a flowchart showing a method for implementing Q&A function for an electronic document according to an embodiment of the present invention in more details.

As shown in FIG. 2, at step 201, a text segment is entered by the writer. Here, a text segment refers to a piece of text composing an electronic document. It may be one or more paragraphs or sentences. The size of a text segment depends on the requirements on the questions that will be extracted. For instance, if it is desired to extract detailed questions from a document, the size of a text segment may be set to be relatively small, otherwise it will be set to be relatively large. And, the writer may define the size of a text segment based on the actual document.

Next, at step 205, one or more questions are generated for said text segment. Specifically, the questions may be entered by the writer manually, or the questions may be generated according to the keyword-based generation or rule-based generation described subsequently in conjunction with FIG. 3 and 4.

Next, at step 210, the generated questions are verified by the writer. Here, the writer may delete, modify the generated questions and add new questions according to his own writing intention (understanding).

Next, at step 215, answers are generated for each question, respectively. Specifically, it is possible for the writer to manually select some words in the text segment as the answer, or the answer may be generated automatically in the way described subsequently in conjunction with FIG. 5.

Next, at step 220, the generated answers are verified by the writer. Here, the writer may delete, modify the generated answers and add new answers according to his own writing intention.

Next, at step 225, a judgment is made as to whether the writing of the document is completed, if not, the process returns to step 201, the writer will continue to write by entering text segments; if the writing has been completed, the process proceeds to step 230.

At step 230, the Q&A information is saved in correspondence with the electronic document. Specifically, according to the preferred embodiment of the present invention, the Q&A information may be saved together with the electronic document as a knowledge tag, for instance, at the end of an electronic document the following is attached:

```
<QandA>
    <Answer> Bob got married with Jean in 1980. </Answer>
    <Question> Is Bob married? </Question>
    <Question> When did Bob get married? </Question>
    ...
    <Question> Who is Bob's wife? </Question>
</QandA>
```

It is also possible to define a tag type of the question's knowledge tag at the header of an electronic document, and in the text of the electronic document, the tag is used to indicate the answers.

As described above, the present invention does not limit the specific way in which the Q&A information is saved. For instance, it may be saved together with the electronic document, that is, as a part of the electronic document, or may be saved separately, as long as it is saved in correspondence with the electronic document.

The electronic document completed by the writer with the Q&A information is transmitted to the reader's browser through a network or other media. At step 235, the reader's browser reads the electronic document and the corresponding Q&A information. Then at step 240, the reader's browser will provide Q&A function based on the Q&A information. Specifically, it is possible to list the questions contained in the Q&A information and to provide the answer to a question selected by the reader; or a question may be entered by the reader, then a question contained in the Q&A information that is the most similar one to the reader entered question (a description will be given below in conjunction with pseudo-code segment 1, showing how to find the most similar question) is presented to the reader together with the answer. Of course, there are other ways for providing Q&A function, the present invention has no limitation to this, as long as the Q&A information corresponding to the electronic document is used.

Figure 3:
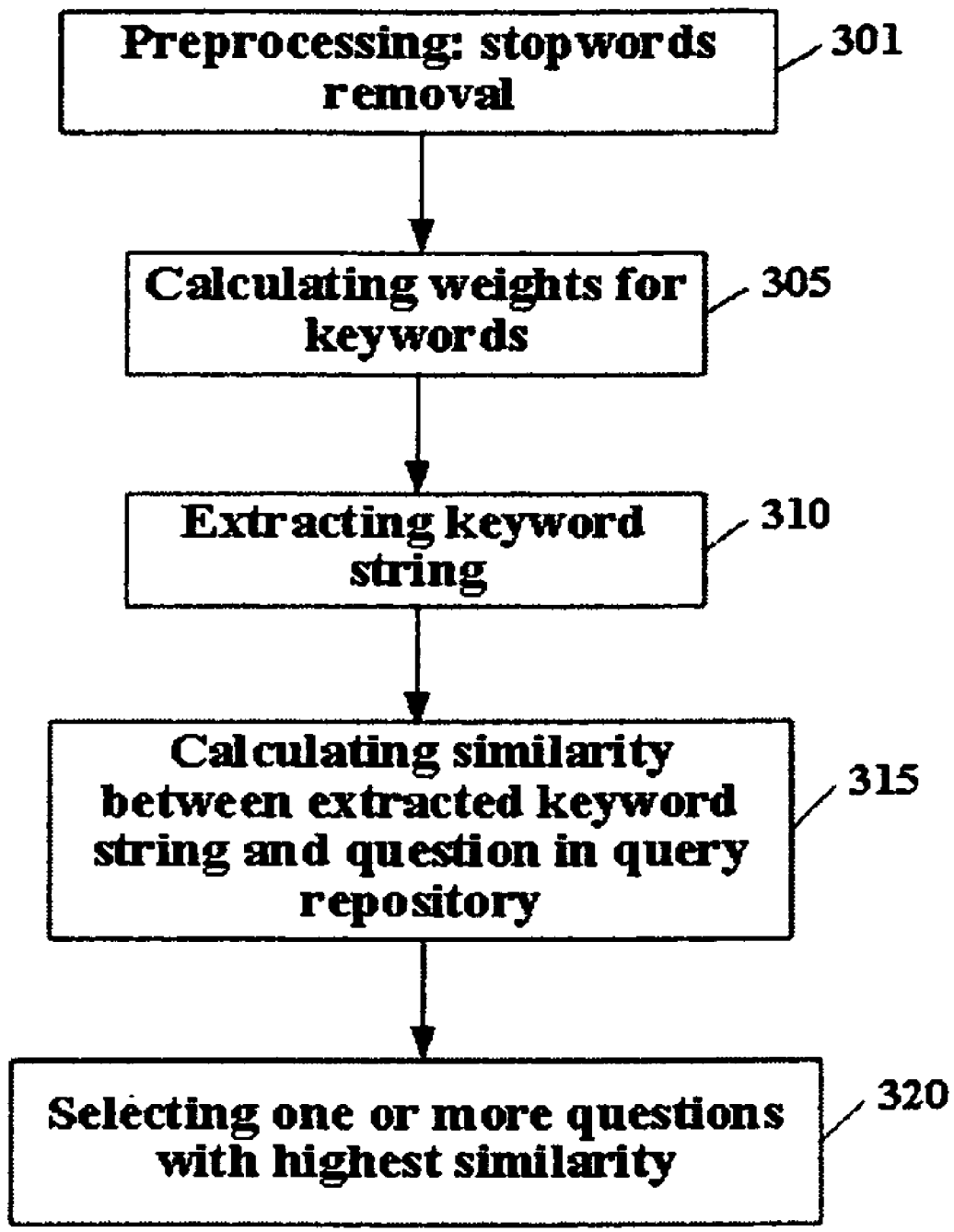
FIG. 3 is a flowchart showing a process for generating questions on the basis of keywords according to an embodiment of the present invention.

FIG. 3 is a flowchart showing a process for generating questions on the basis of keywords according to an embodiment of the present invention. As shown in FIG. 3, first at step 301, the text segment is preprocessed to remove stopwords. Here, a stopword is a word which does not carry substantive meaning to be used as a keyword, such as Chinese character "的", "地", "得", "了"

and the like. After preprocessing, there should be only keywords left.

Next, at step 305, a weight is calculated for each keyword in the text segment. Here, the calculated weight is expected to reflect the importance of the keyword. According to the embodiment of the present invention, frequency of a keyword may be used to calculate the importance of the keyword, such as tf(term frequency) method or tf-idf (term frequency-inverse document frequency) method. The tf method is to calculate a weight according to the frequency of each keyword in the text segment. The tf-idf method is to determine the weight of each keyword by calculating tf×idf, where tf is the times the keyword presents in the text segment T, and idf is the inverse of the times the keyword presents in all text segments of the document. Therefore, tf-idf method can reflect the relative importance of a keyword among different text segments better. Of course, other methods may also be used to calculate the weight of a keyword.

Next, at step 310, a string of keywords is extracted. Specifically, according to the weights calculated for each keyword in step 305, a predetermined number of keywords with highest weights are selected as the string of keywords.

Next at step 315, the similarity between the extracted string of keywords and the questions in a query repository is calculated. Here, the query repository is a repository that contains a lot of question sentences in NL (natural language). The query repository may be composed by experts from various fields or be extracted from a large number of questions accumulated in existing Q&A systems. Following formula (1) may be used to calculate the similarity between a string of keywords and the questions in a query repository:

$$\text{relevance}_{keywords}(KS_i, NL_j) = \sum_k (w_k(KS_i) + w_k(NL_j)) / \text{Max}(wkn(KS_i), wkn(NL_j)) * 2 \quad (1)$$

where, $w_k(KS_i)$ is the weight of the k-th common keyword in both keyword string $KS_i$ and the question $NL_j$ in the query repository within $KS_i$ (the weight is calculated by above step 305), $w_k(NL_j)$ is the weight of the k-th common keyword in both keyword string $KS_i$ and the question $NL_j$ in the query repository within $NL_j$ (default value is 1), and wkn(.) is the sum of weights of all words (except stopwords) forming a string.

Next, at step 320, one or more questions with the highest similarity are selected from the query repository as the questions generated for this text segment.

Furthermore, since the query repository may contain a large number of questions, if the similarities are calculated one by one, the amount of calculation will be very large, so the system performance will be affected. According to a preferred embodiment of the present invention, similar questions in the query repository may be clustered together, and when calculating similarity, only the similarities between the extracted keyword string and the centers of each question clusters is calculated. In this way, the amount of calculation to calculated similarity may be greatly reduced, whereby the system performance can be improved.

Specific principle for clustering may be: based on the similarity of the content being searched, that is, according to the contents, such as common keywords, word order and phrases, between each questions, evaluate the similarity of the questions and clustering the similar questions; or based on users' feedback, that is, if users have clicked different questions in the same document, then these questions will be considered to be similar ones, and if a group of documents are selected to answer a group of questions frequently, then the keywords in these documents are related with the keywords in these questions in some extent.

Figure 4:
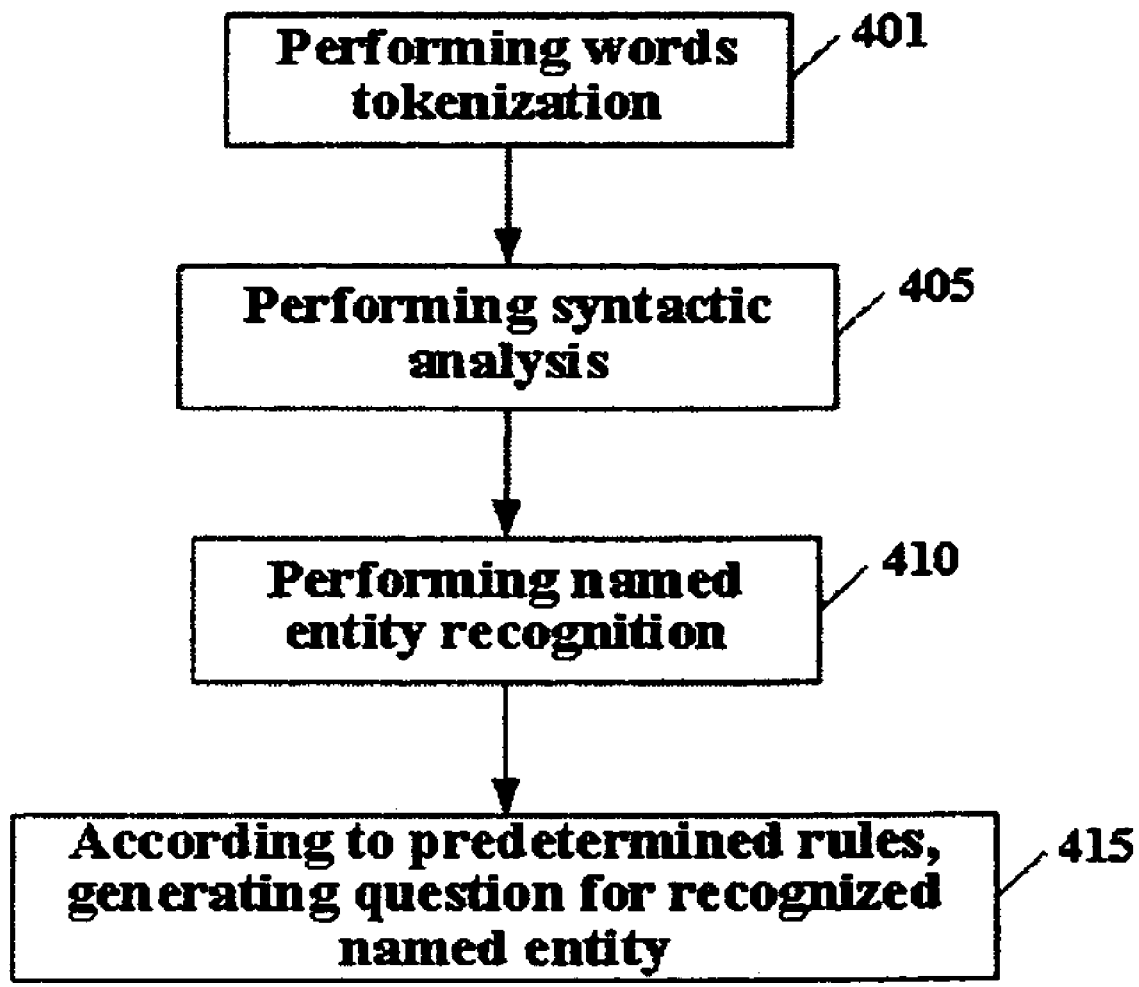
FIG. 4 is a flowchart showing a process for generating questions on the basis of rules according to an embodiment of the present invention.

FIG. 4 is a flowchart showing a process for generating a question on the basis of rules according to an embodiment of the present invention. As shown in FIG. 4, first at step 401, the process of generating questions on the basis of rules performs tokenization to the text segment. The main task of this step is to tokenize words in the text segment.

Next, at step 405, syntactic analysis is performed for the tokenized text segment. Specifically, syntactic analysis is to identify the syntactic structure of sentences in the text segment. The purpose of syntactic analysis is to determine the hierarchical of the input text. Analysis of a linear symbol string from the structural viewpoint is to decompose a superficially linear expression into the deep level graph that is organized in certain structural levels. A linear symbol string is transformed into a combination of language segments with different sizes at several levels, reflecting the differences between various language components in their closeness, order and relation. The article "Syntactic analysis for large vocabulary speech recognition using a context-free covering grammar" by Miller, L. G. et al, International Conference on Acoustics, Speech, and Signal Processing, 1988, pp 271-274, and the article "Syntactic Analysis and Operator Precedence" by Floyd, R. W., in journal "Jour. ACM", Vol. 10, pp 316-333, describe in details the syntactic analysis methods, herein the contents of these articles are incorporated entirely by reference.

Next, at step 410, named entity recognition is performed. The purpose of this step is to identify specific information in a text, such as name, place, date, organization name and so on. Recent researches in named entity recognition emphasize in machine learning methods, such as transformation-based learning, hidden Markov model, decision tree, collocation statistics, maximum entropy model, and EM bootstrapping and the like.

For the methods of named entity recognition, following articles may be referenced, herein the contents of which are incorporated entirely by reference: "Description of the Alembic System Used for MUC-6" by J. Aberdeen et al, journal Proceedings of MUC-6, pp 141-155; "An Algorithm that Learns What's in a Name" by Bikel D. M. et al, journal Machine Learning, 34(1-3), pp 211-231; "Description of the Japanese NE System Used for MET-2" by Sekine S, journal MUC-7 Proc., 1988; "Using Collocation Statistics in Information Extraction" by Lin D., journal MUC-7 Proc., 1988;

and "A Maximum Entropy Approach over to Named Entity Recognition" by Borthwick A., Ph.D. Thesis, New York Univ., 1999.

Then, at step 415, according to predetermined rules, questions are generated for the recognized named entity. The task of this step is to generate a corresponding question list according to a group of predetermined rules. These rules may be drawn up by knowledge engineers who are familiar with the questions in Q&A systems, for example, by pattern matching via a named entity to capture question points and generate questions. Following is an example of the rule:

Person→who/whom
Time/date→when
Location→where/what place
Product→what brand
Number→how many Now, take the sentence "John Hume and David Trimble won the 1998 Nobel Peace Prize." as an example to illustrate how to generate questions by using the above-mentioned rule of pattern matching. Suppose that named entities "person" and "prize" have been recognized through above steps 401-410. By analyzing the components in the sentence, question points are to be found in these named entities. Here, without losing generality, suppose that "person" (John Hume and David Trimble) is selected as a question point. Then, according to the predetermined rules and the syntactic structure of the sentence, it is mapped to a question type (who/whom), and finally a question "Who won the 1998 Nobel Peace Prize?" is generated.

Figure 5:
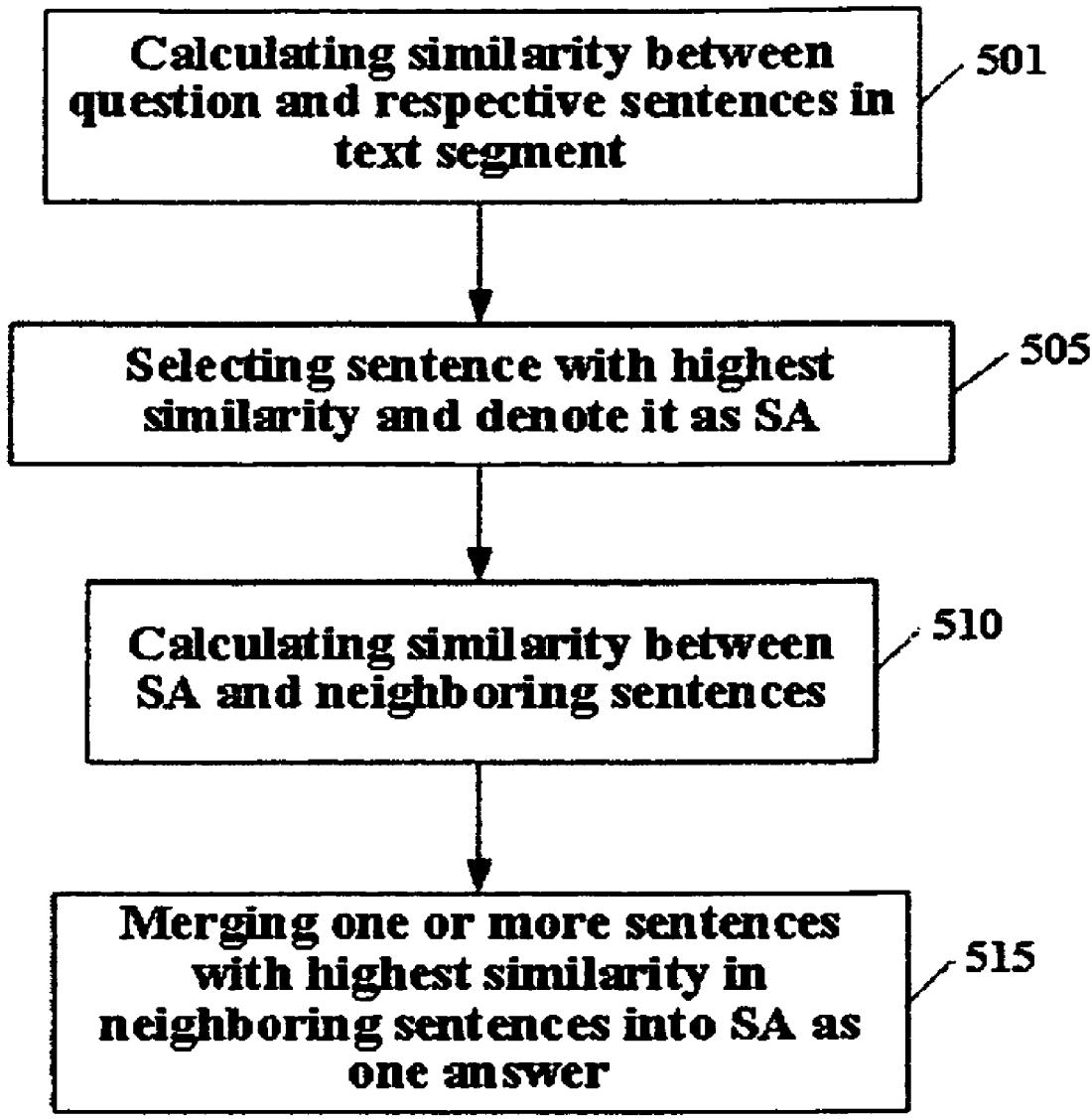
FIG. 5 is a flowchart showing a process for generating an answer for a question according to an embodiment of the present invention.

FIG. 5 is a flowchart showing a process for generating an answer for a question according to an embodiment of the present invention. As shown in FIG. 5, first at step 501, a similarity between the question and each sentence in the corresponding text segment is calculated. Calculation of the similarity between two sentences may be performed by using algorithm 1 in the pseudo code segment 1 appended to the Specification. In this code segment, calculation of the value of value is similar to the method of above formula (1), it is also evaluated by the weight of the keyword.

Next, at step 505, a sentence with the highest value is selected and denoted as SA. Specifically, the similarity of each sentence in the text segment may be ranked and the sentence with the highest value be selected.

Next, at step 510, the similarities between the answer sentence SA and its neighboring sentences are calculated. Here, the neighboring sentences are those sentences in certain range around SA. Calculation of the similarities can also be performed through algorithm 1 in the pseudo code 1.

Next, at step 515, one or more sentences with the highest similarity in neighboring sentences are merged into SA as the answer to the question.

From above embodiment it can be seen that, by using the method for implementing Q&A function for an electronic document according to the embodiment of the present invention, especially if the above-mentioned method for automatic generation of questions and answers is used, without too much burden to the writer, the writer's understanding to the document (it is definitely the most accurate understanding) may be used to ensure the accuracy and readability of the generated questions and answers, thereby the accuracy and reliability of the questions and answers may be greatly improved.

Method for Computer-Aided Authoring

Under the same inventive conception, according to another aspect of the present invention, there is provided a method for computer-aided authoring, including: when the writer is writing a document, generating Q&A information used for the Q&A function of said electronic document; and saving said Q&A information in correspondence with said electronic document.

Specifically, the method of the present invention for computer-aided authoring may include steps 201 through 203 shown in FIG. 2, and the processes, shown in FIGS. 3, 4 and 5, for generating questions and answers on the basis of keywords and on the basis of rules are both applicable to the method of present embodiment. For brevity, they are not described repeatedly.

Thus, by using the method for computer-aided authoring according to the embodiment of the present invention, the writer may get assistance in preparing Q&A information when he is writing. Especially, if the above-mentioned method for automatic generation of questions and answers is used, without too much burden to the writer, the writer's understanding to the document (it is definitely the most accurate understanding) may be used to ensure the accuracy and readability of the generated questions and answers.

Computer-Aided Authoring Apparatus

Figure 6:
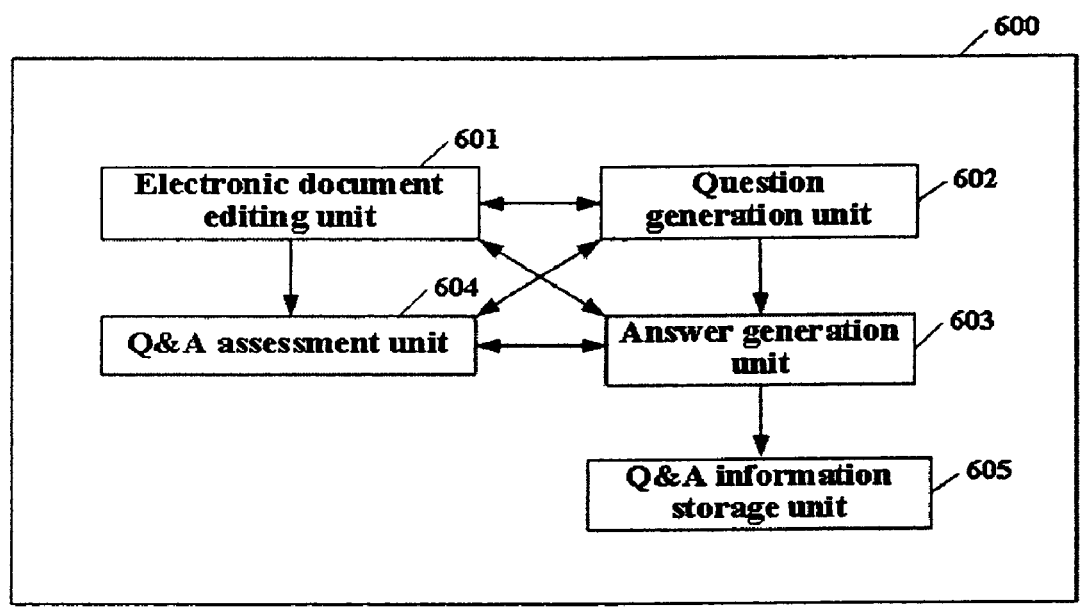
FIG. 6 is a block diagram illustrating the structure of a computer-aided authoring apparatus according to an embodiment of the present invention.

Under the same inventive conception, according to another aspect of the present invention, there is provided a computer-aided authoring apparatus. FIG. 6 is a block diagram illustrating the structure of a computer-aided authoring apparatus according to an embodiment of the present invention.

As shown in FIG. 6, the computer-aided authoring apparatus 600 includes: an electronic document editing unit 601 for editing an electronic document, which may be a standalone document editing unit or may share an existing document editor, such as MS Word, WPS or the like; a question generation unit 602 for generating one or more questions based on the entered text in said electronic document editing unit 601; an answer generation unit 603 for generating answers for the questions generated by said question generation unit 602 based on the text in said electronic document editing unit 601; a Q&A information storage unit 605 for storing said generated questions and corresponding answers as Q&A information in correspondence with said edited electronic document; and a Q&A assessment unit 604 for allowing the writer to assess and verify generated questions and answers.

Preferably, when the question generation unit 602 generates questions by using above described method for generating questions on the basis of keywords, the computer-aided authoring apparatus 600 further includes: a query repository for storing a plurality of questions, from which the question generation unit 602 may select one or more questions with high similarities. And, the question generation unit 602 further includes: means for calculating weight for each keyword in the input-text segment according to the frequency of said keyword in the text segment and the frequency of said keyword in other text segments in the same electronic document; means for extracting a keyword string according to the weight of each keyword in said text segment; means for calculating the similarity between said extracted keyword string and the questions in said query repository; and means for selecting one or more questions with high similarities.

Preferably, when the question generation unit 602 generates questions by using above described method for generating questions on the basis of rules, the question generation unit 602 further includes: means for performing tokenization of the input text segment; means for performing syntactic analysis of the sentences in said text segment; means for performing named entity recognition of said text segment;

and means for generating questions for the recognized named entities according to predetermined rules.

From the above description it can be seen that the computer-aided authoring apparatus 600 of the present embodiment may perform the above described method for computer-aided authoring, thereby the writer may get assistance in performing preparation of Q&A information during his writing.

Method for Browsing an Electronic Document

Under the same inventive conception, according to another aspect of the present invention, there is provided a method for browsing electronic documents, wherein the electronic document is a document generated through the above described method for computer-aided authoring, that is, Q&A information used for Q&A function is saved in correspondence with said electronic document. When a reader is browsing an electronic document, first the content of said electronic document and its corresponding Q&A information is read out, then the content of said electronic document will be presented to the user. And, if the user has selected Q&A function through operation, Q&A function will be provided by using said Q&A information.

As described above, there are many ways for presenting questions and answers, such as, it is possible to first present the questions contained in said Q&A information to the user for selection, then in response to the user's selection, present the answers to the user; or a question, the answer of which is desired, is entered by the user first, then according to the similarities (Algorithm 1 may be used for calculating similarities) between the user entered question and the questions contained in said Q&A information, one or more questions closest to the user entered question and their corresponding answers will be presented to the user. Of course, there may be many other ways.

Thus, by using the method for browsing an electronic document according to the embodiment of the present invention, the Q&A information saved in correspondence with the electronic document may be used for proving Q&A function to the user. Since said Q&A information is the accurate information prepared with the writer's participation during his writing, the present embodiment may provide accurate questions and answers by using the information.

Browser Capable of Providing Q&A Function

Under the same inventive conception, according to another aspect of the present invention, there is provided a browser capable of providing Q&A function, wherein the electronic document is a document generated through the above described method for computer-aided authoring, that is, Q&A information used for Q&A function is saved in correspondence with said document.

Figure 7:
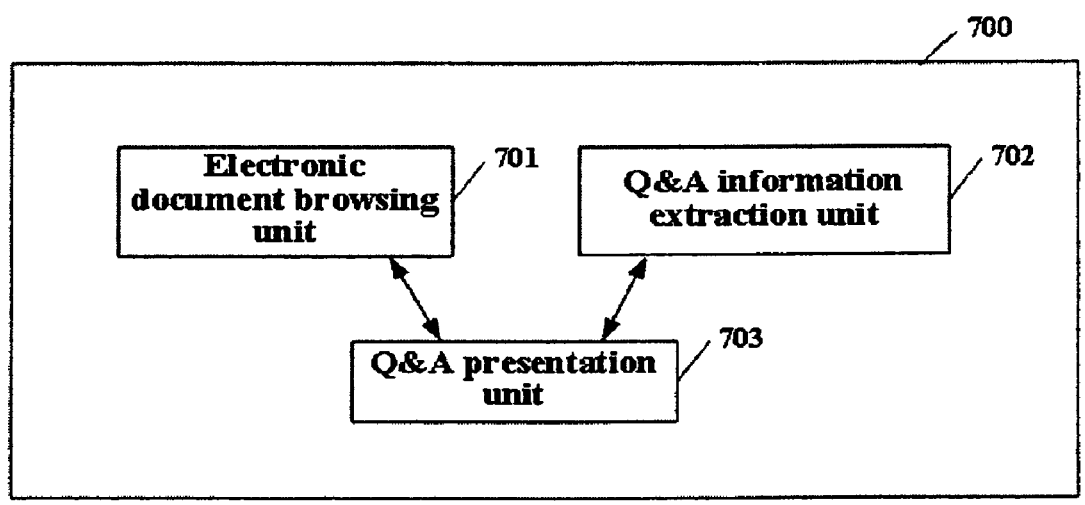
FIG. 7 is a block diagram illustrating the structure of a browser capable of providing Q&A function according to an embodiment of the present invention.

FIG. 7 is a block diagram illustrating the structure of a browser capable of providing Q&A function. As shown in FIG. 7, a browser 700 includes: an electronic document browsing unit 701 for browsing an electronic document, which may be a standalone document browsing unit, or may share an existing document browser, such as MS IE, Acrobat Reader or the like; a Q&A information extracting unit 702 for extracting Q&A information saved in correspondence with said browsed electronic document, wherein said Q&A information contains questions and corresponding answers related to the electronic document; and a Q&A presenting unit 703 for presenting the questions and answers contained in said Q&A information to the user.

The browser of the present embodiment may implement above-described method for browsing an electronic document. Furthermore, the browser may further include: a similarity calculation unit for calculating the similarities (above mentioned algorithm 1 may be used for calculating) between the user entered question and the questions contained in said Q&A information. Thereby, it is possible for a user to enter a question, and one or more questions closest to the user entered question and their corresponding answers will be presented to the user.

From above description it can be seen that, by using the browser of the embodiment of the present invention, the Q&A information saved in correspondence with the electronic document may be used for providing Q&A function to the user. Since said Q&A information is the accurate information prepared with the writer's participation during his writing, the present embodiment may provide accurate questions and answers by using the information.

Method for Providing Q&A Service Utilizing Computers

Under the same inventive conception, according to another aspect of the present invention, there is provided a method for providing Q&A service utilizing computers. The implementation of the method is also based on the fact that the electronic document is generated through the above described method for computer-aided authoring, so that Q&A information is saved in correspondence with said electronic document.

Figure 8:
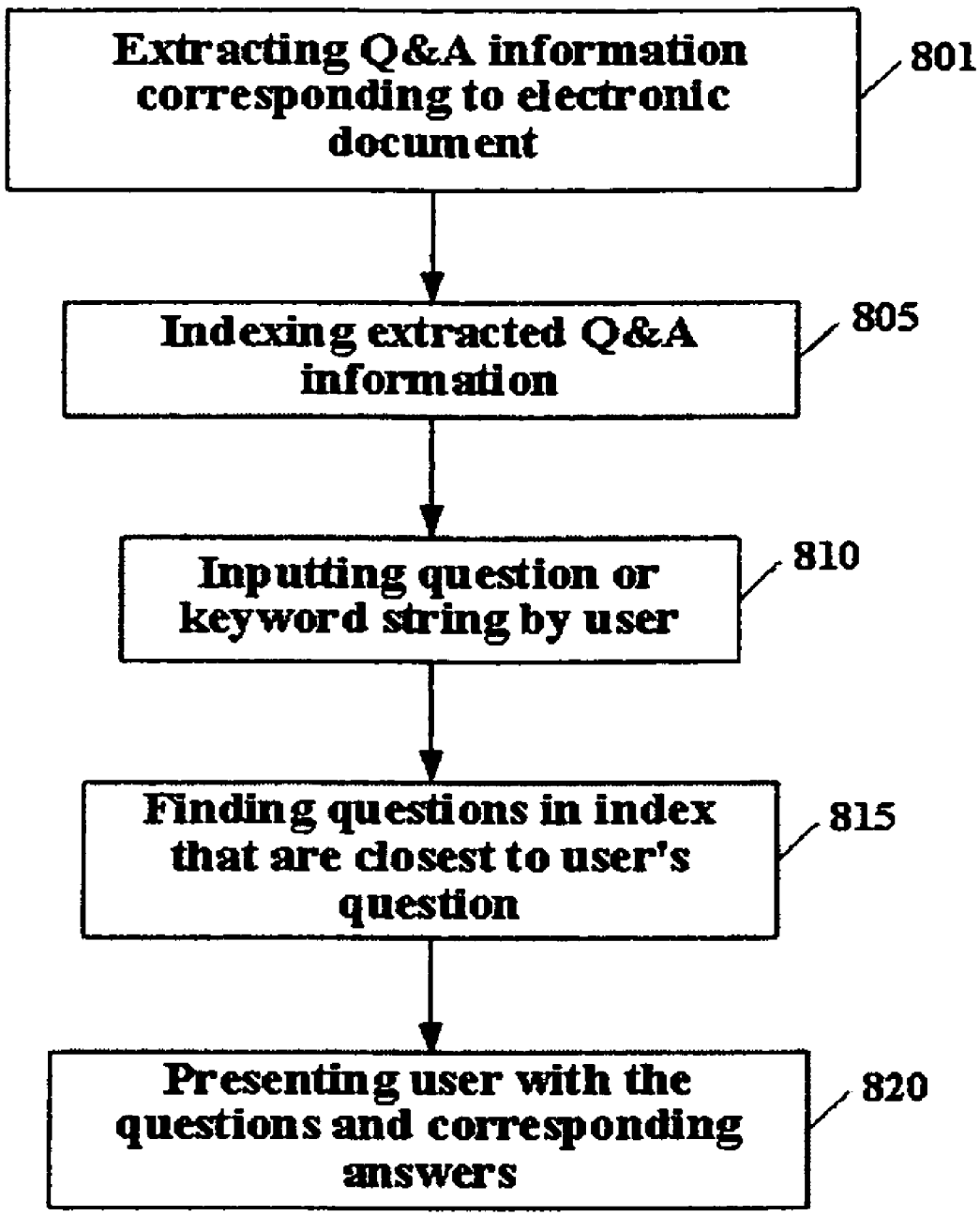
FIG. 8 is a flowchart showing a method for providing Q&A service according to an embodiment of the present invention.

FIG. 8 is a flowchart showing the method for providing Q&A service according to an embodiment of the present invention. As shown in FIG. 8, first at step 801, Q&A information corresponding to a plurality of electronic documents is extracted, respectively, wherein said Q&A information contains questions and corresponding answers related to said electronic documents. Specifically, if the writer of the electronic document uses the above-described computer-aided authoring apparatus 600 to write an document, then each electronic document would have a piece of corresponding Q&A information. This step is to extract the Q&A information for a plurality of electronic documents. In particular, for the electronic documents published on the Internet, a web crawler may be used to crawl over each electronic document and extract their corresponding Q&A information, such as, from a knowledge tag.

Next, at step 805, an index is made for the extracted Q&A information. Here, various indexing methods commonly used in the field of information retrieving may be utilized to index the questions and/or answers in the Q&A information, such as, reverse file, signature file, PAT tree, PAT array or the like.

Next, at step 810, a user enters a question to be answered or a keyword string.

Next, at step 815, a question closest to the question entered by the user is found from said question index. This step may use the above-mentioned algorithm 1 to calculate similarities, and select one or more questions with the highest similarity. Of course, other existing methods may also be used.

Then, at step 802, the found closest questions and their corresponding answers are presented to the user.

Furthermore, the present embodiment may further include: the step of providing said user with the contents or links of the electronic documents corresponding to said user selected questions (not shown in FIG. 8) in response to user's operation.

From the above description it can be seen that the present embodiment may use the Q&A information saved in correspondence with the electronic document for providing Q&A service in a broader range to the user. Since said Q&A information is the accurate information prepared with the writer's participation during his writing, the present embodiment may provide accurate questions and answers by using the information. Moreover, the method of the present embodiment is particularly suitable for extracting Q&A information and providing Q&A service in a network environment.

System for Providing Q&A Service

Figure 9:
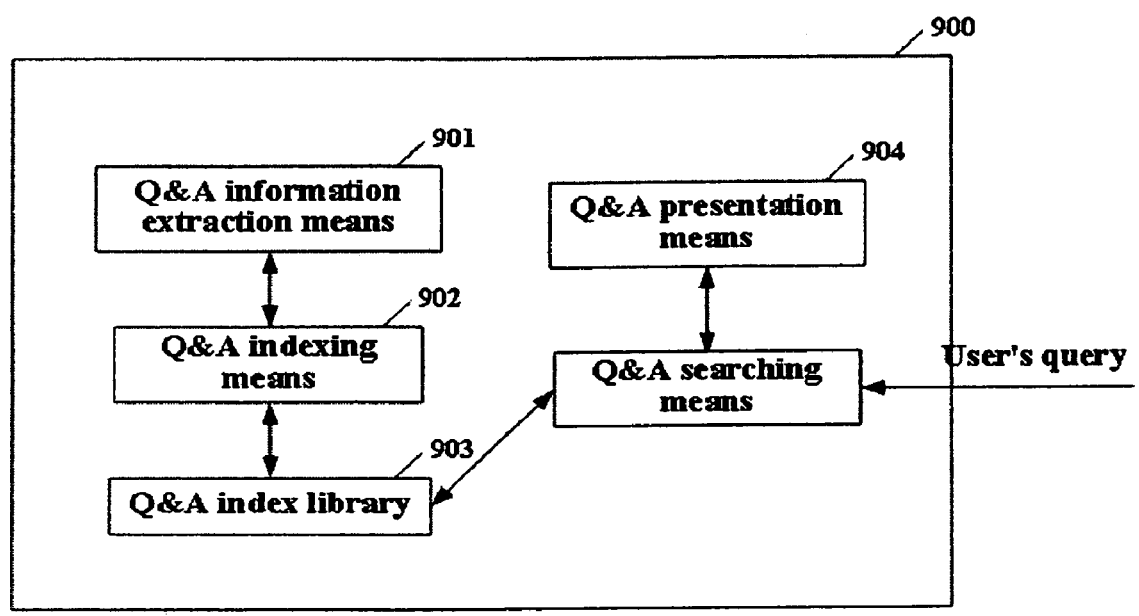
FIG. 9 is a block diagram illustrating the structure of a system for providing Q&A service according to an embodiment of the present invention.

Under the same inventive conception, according to another aspect of the present invention, there is provided a system for providing Q&A service. FIG. 9 is a block diagram illustrating the structure of a system for providing Q&A service according to an embodiment of the present invention.

As shown in FIG. 9, system 900 includes: Q&A information extraction means 901 for extracting Q&A information corresponding to a plurality of electronic documents, respectively, wherein said Q&A information contains questions and corresponding answers related to said electronic documents. As described above, if the writer of the electronic document uses the above-described computer-aided authoring apparatus 600 to write an document, then each electronic document would have a piece of corresponding Q&A information. The Q&A information extraction unit 901 is used to extract the Q&A information for a plurality of electronic documents. For example, the Q&A information extraction unit 901 may be a web crawler crawling over each electronic document published on the network and extracting the corresponding Q&A information.

The system 900 further includes: Q&A indexing means 902 for indexing extracted Q&A information; a Q&A index library 903 for storing Q&A information index prepared by said Q&A indexing means 902; Q&A searching means 905 for finding one or more the most similar questions from said Q&A index library 903; and Q&A presentation means 905 for presenting said found questions and corresponding answers to said user.

From above description it can be seen that, the system for providing Q&A service of the embodiment of the present invention may implement the above-described method for providing Q&A service. By using the Q&A information saved in correspondence with the electronic document the system may provide Q&A service in a broader range to the user. Since said Q&A information is the accurate information prepared with the writer's participation during his writing, the present embodiment may provide accurate questions and answers by using the information.

Above described computer-aided authoring apparatus, browser capable of providing Q&A function and system for providing Q&A service as well as their respective components may be implemented in the form of hardware and software, and may be combined with other means as needed. The computer-aided authoring apparatus and the browser for providing Q&A function may be implemented simultaneously on one computer, and the components of one apparatus or system may be physically separated from and operationally interconnected to each other to perform a specific function.

Though a method for implementing Q&A function for an electronic document, a method for computer-aided authoring, a method for browsing an electronic document, a computer-aided authoring apparatus, a browser capable of providing Q&A function, a method for providing Q&A service utilizing computers and a system for providing Q&A service of the present invention have been described in details through some exemplary embodiments, these embodiments are not exhaustive. Those skilled in the art can make various variations and modifications within the spirit and scope of the present invention. Therefore, the present invention is not limited to these embodiments. The scope of the present invention is only defined by the appended claims.

Pseudo Code Segment 1

Algorithm 1: calculate the similarity between two sentences (supposing each word in the sentences, except stopwords, has a weight to indicate its importance, the default weight value for each word is 1.)

$Sim(s1,s2)$
$\{$
  calculate $$value = \sum_k (w_k(s1) + w_k(s2))/Max(wkn(s1), wkn(s2)) * 2$$

(calculate the similarity between two sentences)
  return value;
$\}$

The invention claimed is:

1. A method for implementing a question and answer function based on an electronic document, comprising:
   generating a question about a text segment of said electronic document before said electronic document is completed by an author;
   extracting an answer to said question from said text segment before said electronic document is completed by said author, wherein said extracting an answer, comprises:
     calculating a similarity between said question and each sentence of said text segment;
     selecting a sentence of said text segment having a highest similarity score and denoting said sentence as a sentence answer;
     calculating similarities between said sentence answer and neighboring sentences of said text segment; and
     merging a neighboring sentence having a next highest similarity score into said sentence answer to form one answer;
   saving said question and said answer as question and answer information that is in correspondence with a completed electronic document;
   using said question and answer information for providing said question and answer function; and
   outputting said question and answer information to a user.

2. The method for implementing a question and answer function for an electronic document according to claim 1, wherein said generating said question, comprises:
   according to keywords in the text segment entered by the author, selecting one or more questions from a query repository.

3. The method for implementing a question and answer function for an electronic document according to claim 2, wherein said selecting one or more questions from a query repository, comprises:
   according to at least one of a frequency of each keyword in said text segment and its frequency in other text segments of said electronic document, calculating a weight for said each keyword;
   according to the weight of said each keyword in said text segment, extracting a keyword string;
   calculating similarity between said extracted keyword string and questions in said query repository; and
   selecting said one or more questions with high similarities.

4. The method for implementing a question and answer function for an electronic document according to claim 3, wherein the questions in said query repository are clustered; in which said step of calculating similarity between said extracted keyword string and the questions in said query repository only calculates the similarity between said extracted keyword string and the cluster center of the questions in said query repository.

5. The method for implementing a question and answer function for an electronic document according to claim 1, wherein generating a question, comprises:
performing tokenization for the text segment;
performing syntactic analysis for sentences in said text segment;
performing named entity recognition for said text segment; and
according to predetermined rules, generating questions for recognized named entities.

6. The method for implementing a question and answer function for an electronic document according to claim 1, further comprising:
after said generating a question, allowing the author to verify said question.

7. The method for implementing a question and answer function for an electronic document according to claim 1, wherein said generating a question, comprises: manually entering one or more questions by the author.

8. The method for implementing a question and answer function for an electronic document according to claim 1, wherein, the similarity between two sentences is calculated through keywords contained in the two sentences.

9. The method for implementing a question and answer function for an electronic document according to claim 1, further comprising:
after extracting the answer to said question, the writer verifies said answer so as to ensure reliability of the answer.

10. The method for implementing a question and answer function for an electronic document according to claim 1, wherein said extracting an answer to said question from said text segment comprises: at least one of manually entering and specifying an answer to said question by the author.

11. The method for implementing a question and answer function for an electronic document according to claim 1, wherein said using said question and answer information for providing said question and answer function, comprises:
reading by the user the question and answer information corresponding to said electronic document;
providing questions contained in said question and answer information to the user for selecting; and
in response to the user's selection, providing corresponding answers.

12. The method for implementing a question and answer function for an electronic document according to claim 1, wherein said using said question and answer information for providing said question and answer function, comprises:
reading by the user the question and answer information corresponding to said electronic document;
entering by the user a question to which an answer is desired; and
according to the similarities between the question entered by the user and the questions contained in said question and answer information, providing one or more questions closest to the question entered by the user and corresponding one or more answers to the user.

13. A program storage device readable by machine, tangibly embodying a program of instructions executable by said machine to perform a method for computer-aided authoring comprising:
generating a question about a text segment of an electronic document before said electronic document is completed by an author;
extracting an answer to said question from said text segment before said electronic document is completed by said author, wherein said extracting an answer, comprises:
calculating a similarity between said question and each sentence of said text segment;
selecting a sentence of said text segment having a highest similarity score and denoting said sentence as a sentence answer;
calculating similarities between said sentence answer and neighboring sentences of said text segment; and
merging a neighboring sentence having a next highest similarity score into said sentence answer to form one answer;
saving said question and said answer as question and answer information that is in correspondence with a completed electronic document;
using said question and answer information for providing said question and answer function; and
outputting said question and answer information to a user.

14. The method for computer-aided authoring according to claim 13, wherein said generating said question, comprises:
according to keywords in the text segment entered by the author, selecting one or more questions from a query repository.

15. The method for computer-aided authoring according to claim 14, wherein said selecting one or more questions from a query repository, comprises:
according to at least one of a frequency of each keyword in said text segment and its frequency in other text segments of said electronic document, calculating a weight for said each keyword;
according to the weight of said each keyword in said text segment, extracting a keyword string;
calculating similarity between said extracted keyword string and questions in said query repository; and
selecting said one or more questions with high similarities.

16. The method for computer-aided authoring according to claim 15, wherein the questions in said query repository are clustered; in which said step of calculating similarity between said extracted keyword string and the questions in said query repository only calculates the similarity between said extracted keyword string and the cluster center of the questions in said query repository.

17. The method for computer-aided authoring according to claim 13, wherein generating a question, comprises:
performing tokenization for the text segment;
performing syntactic analysis for sentences in said text segment;
performing named entity recognition for said text segment; and
according to predetermined rules, generating questions for recognized named entities.

18. The method for computer-aided authoring according to claim 13, further comprising:
after said generating a question, allowing the author to verify said question.

19. The method for computer-aided authoring according to claim 13, wherein said generating a question, comprises:
manually entering one or more questions by the author.

20. The method for computer-aided authoring according to claim 13, wherein, the similarity between two sentences is calculated through keywords contained in the two sentences.

21. The method for computer-aided authoring according to claim 13, further comprising:
after extracting the answer to said question, the writer verifies said answer so as to ensure reliability of the answer.

22. The method for computer-aided authoring according to claim 13, wherein said extracting an answer to said question from said text segment comprises:
at least one of manually entering and specifying an answer to said question by the author.

23. A computer-aided authoring apparatus, comprising:
an electronic document editing unit for editing an electronic document by an author;
a question generation unit for generating a question about a text segment of said electronic document before said electronic document is completed by said author;
an answer extraction unit for extracting an answer to said question from said text segment before said electronic document is completed by said author, wherein said answer extraction unit further comprises:
means for calculating a similarity between said question and each sentence of said text segment;
means for selecting a sentence of said text segment having a highest similarity score and denoting said sentence as a sentence answer;
means for calculating similarities between said sentence answer and neighboring sentences of said text segment; and
means for merging a neighboring sentence having a next highest similarity score into said sentence answer to form one answer;
a question and answer information storage unit for storing said question and answer information that is in correspondence with a completed electronic document; and
an output for outputting said question and answer information to a user.

24. The computer-aided authoring apparatus according to claim 23, further comprises a query repository in which a plurality of questions are saved,
in which said question generation unit, according to the keywords in the entered text segment, selects one or more questions from said query repository.

25. The computer-aided authoring apparatus according to claim 23, wherein said question generation unit comprises:
means for performing tokenization for the text segment;
means for performing syntactic analysis for sentences in said text segment;
means for performing named entity recognition for said text segment; and
means for generating a question for recognized named entities according to predetermined rules.

26. The computer-aided authoring apparatus according to claim 23, further comprising:
a question and answer assessment unit for allowing the author to assess and verify generated questions and answers.

27. A method, comprising:
generating a question about a text segment of an electronic document before said electronic document is completed by an author;
extracting an answer to said question from said text segment before said electronic document is completed by said author, wherein said extracting an answer, comprises:
calculating a similarity between said question and each sentence of said text segment;
selecting a sentence of said text segment having a highest similarity score and denoting said sentence as a sentence answer;
calculating similarities between said sentence answer and neighboring sentences of said text segment; and
merging a neighboring sentence having a next highest similarity score into said sentence answer to form one answer;
saving said question and said answer as question and answer information that is in correspondence with a completed electronic document; and
outputting said question about said text segment and a corresponding answer to a user.

28. The method according to claim 27, further comprising at least one of:
verifying said question by said author, comprising at least one of deleting said question, modifying said question, and adding at least one additional question; and
verifying said answer by said author, comprising at least one of deleting said answer, modifying said answer, and adding at least one additional answer.

* * * * *